United States Patent
Low et al.

(10) Patent No.: US 9,125,120 B2
(45) Date of Patent: Sep. 1, 2015

(54) APPARATUS AND METHOD FOR INTERNETWORKING INTERFACE IN MULTIMODE WIRELESS COMMUNICATION

(75) Inventors: Su-Lin Low, San Diego, CA (US); Wei-Dong Zhang, San Diego, CA (US); Hausting Hong, San Diego, CA (US); Yanzhi Zhang, Zhejiang (CN); Jianzhi Wang, Zhejiang (CN)

(73) Assignee: VIA TELECOM CO., LTD., George Town (KY)

( * ) Notice: Subject to any disclaimer, the term of this patent is extended or adjusted under 35 U.S.C. 154(b) by 443 days.

(21) Appl. No.: 13/197,179

(22) Filed: Aug. 3, 2011

(65) Prior Publication Data

US 2012/0069823 A1    Mar. 22, 2012

Related U.S. Application Data

(60) Provisional application No. 61/384,816, filed on Sep. 21, 2010.

(51) Int. Cl.
  *H04B 7/216* (2006.01)
  *H04W 36/14* (2009.01)
  *H04W 4/00* (2009.01)
  *H04W 88/06* (2009.01)

(52) U.S. Cl.
  CPC ............. *H04W 36/14* (2013.01); *H04W 4/00* (2013.01); *H04W 88/06* (2013.01)

(58) Field of Classification Search
  CPC .................. H04B 7/2628; H04B 2201/70701; H04B 2201/70702; H04B 2201/70718
  USPC ........................................ 370/335, 338, 339
  See application file for complete search history.

(56) References Cited

U.S. PATENT DOCUMENTS

| 7,634,764 | B2 * | 12/2009 | Heinz | 717/140 |
|---|---|---|---|---|
| 2002/0068608 | A1 * | 6/2002 | Souissi | 455/557 |
| 2005/0073977 | A1 * | 4/2005 | Vanghi et al. | 370/335 |
| 2006/0294584 | A1 * | 12/2006 | Sundaram | 726/11 |
| 2007/0286162 | A1 * | 12/2007 | Fabbrizio et al. | 370/352 |
| 2010/0077108 | A1 * | 3/2010 | Crom et al. | 710/11 |
| 2010/0227639 | A1 | 9/2010 | Kim et al. | |
| 2010/0296419 | A1 * | 11/2010 | Kim et al. | 370/297 |
| 2011/0110256 | A1 * | 5/2011 | Han et al. | 370/252 |

* cited by examiner

*Primary Examiner* — Hassan Phillips
*Assistant Examiner* — Siren Wei
(74) *Attorney, Agent, or Firm* — Richard K. Huffman; James W. Huffman

(57) ABSTRACT

An apparatus supporting MTC in an LTE environment including an LTE modem and a CDMA modem. The LTE modem accesses a first wireless network and executes first data transactions, where the first wireless network comports with LTE standards. The CDMA modem is operationally coupled to the LTE modem, and accesses a second wireless network and executes second data transactions, where the second wireless network comports with one or more CDMA-based standards. The CDMA modem includes an inter-radio access technology (IRAT) API element and an inter-process communication (IPC) module. The IRAT API element is configured to send/receive IRAT messages via function calls to/from the LTE modem, where the IRAT messages remain the same regardless of interface requirements for the LTE modem. The IPC module is coupled to the IRAT API element, and is configured to generalize the function calls to enable the CDMA modem to interoperate with the LTE modem.

20 Claims, 4 Drawing Sheets

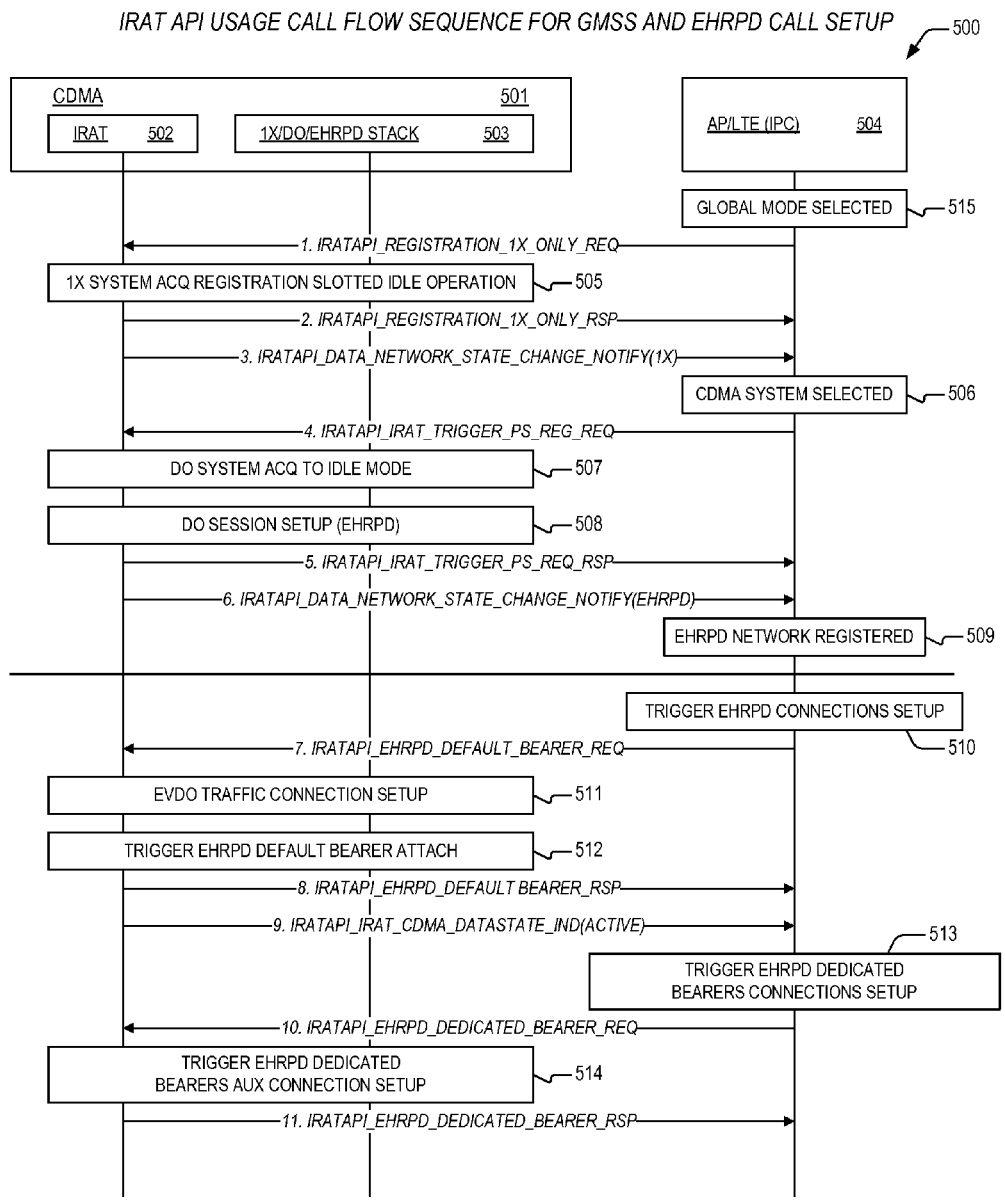

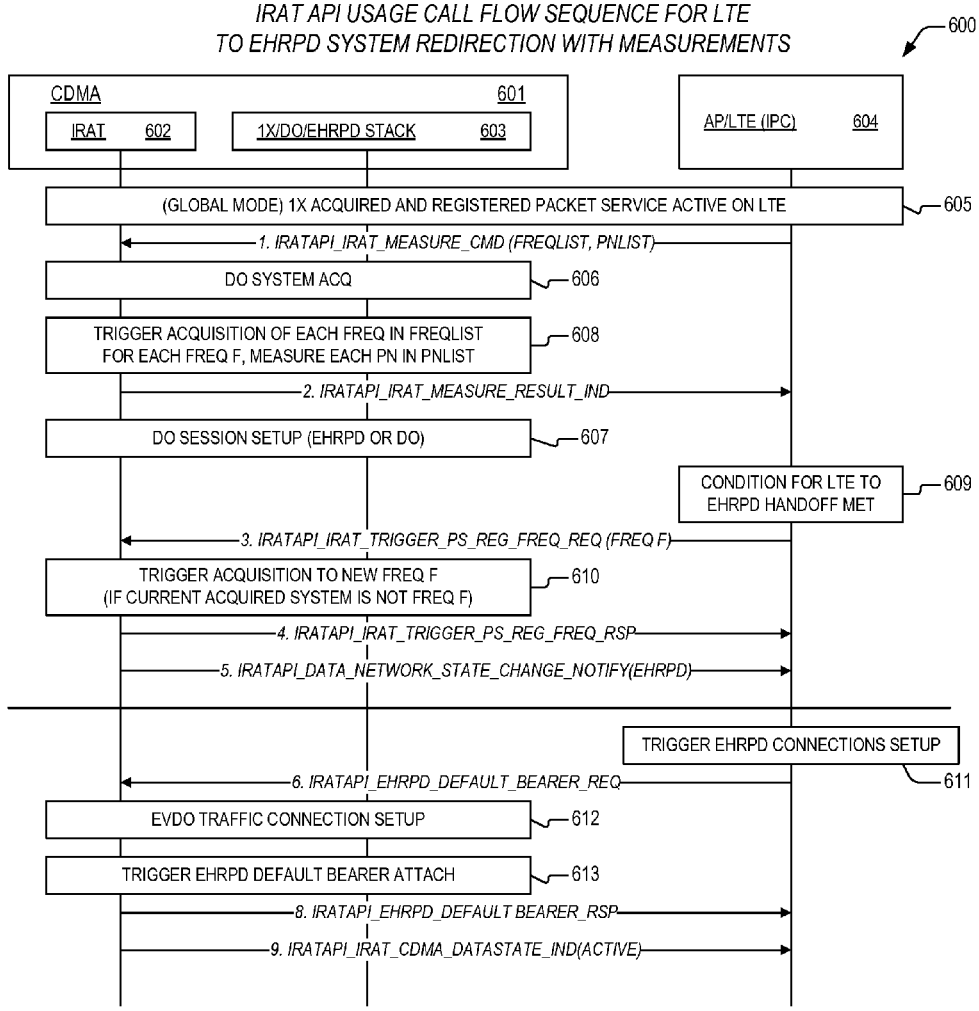

APPARATUS AND METHOD FOR INTERNETWORKING INTERFACE IN MULTIMODE WIRELESS COMMUNICATION

CROSS-REFERENCE TO RELATED APPLICATIONS

This application claims the benefit of the following U.S. Provisional Applications, each of which is herein incorporated by reference for all intents and purposes.

| SERIAL NUMBER | FILING DATE | TITLE |
| --- | --- | --- |
| 61384816 (VTU.10-0033-US) | Sep. 21, 2010 | ACCESS PROCEDURE ENHANCEMENT TO SUPPORT CONNECTIONLESS TRANSMISSION FOR MTC APPLICATIONS IN LTE |

BACKGROUND OF THE INVENTION

1. Field of the Invention

This invention relates in general to the field of wireless communications, and more particularly to an apparatus and method for providing a multimode smartphone with inter-radio access technology (IRAT) internetworking features and capabilities.

2. Description of the Related Art

The cell phone industry is undergoing exponential growth, not only in this country, but all over the world. In fact, it is well known that the over twenty percent of the adult population in the United States does not have a traditional landline telephone. It is also noteworthy that nearly ninety percent of the adult population owns a wireless phone (i.e. cell phone).

In addition to this growth in ownership, the usage of cell phones is increasing as well over the use of traditional landline telephone coverage. In fact, one in seven adults now uses cell phones exclusively. Whereas in the past cell phones were used when a landline was not available or under emergency conditions, lower carrier rates, affordability of family packages, and free mobile-to-mobile or friend-to-friend promotions have fostered in significant increases in usage. It is not uncommon today to walk into any public forum or facility and observe a majority of the people there talking, texting, or accessing data on their cell phones.

The ability to communicate using a wireless mobile phone has been available since the middle of the last century. However, during the 1990's so-called "2G" or second generation mobile phone systems were fielded that began the growth in both deployment and usage that we currently enjoy today. These initial systems predominately provided for the routing and reliable servicing of voice calls between parties. But even at this time, rudimentary protocols were established to enable cell phones to receive and transmit data as well as voice. Exemplary networks include General Packet Radio Service (GPRS) and Enhanced Data rates for GSM Evolution (EDGE), providing data rates up to roughly 60 Kilobits per second.

During the early 2000's so-called "3G" or third generation cellular systems were fielded that have provided significant increases in user capacity, quality of service, and data rate. CDMA2000, also known as 1xRTT, is perhaps the most prevalent of these 3G systems and this protocol is well known by those in the art to provide for excellent transmission of voice and data. In concert, newer and faster data networks were fielded providing for data rates greater than 2 Megabits per second.

In the past few years, however, there has been an exponential increase in the requirement for data access from a mobile device. Users now check their email, browse the web, and send and receive pictures and movie clips—all from their mobile phones. Accordingly, developers continue to make advances in data networks and protocols to support this pull from the user community. More recently, systems are now being fielded that support so-called Long Term Evolution (LTE) standard, providing for peak data rates up to 100 Megabits per second, as supported by the $3^{rd}$ Generation Partnership Project (3GPP).

Thus, in addition to supporting legacy data and voice standards, present day cell phone manufacturers must also support LTE. But because of the vast network and modulation differences between LTE and legacy voice and data standards, it has become common practice to develop so-call multimode smartphones that support legacy data standards as well as LTE. To accomplish this objective, smartphone developers typically employ a modem that comprehensively provides for existing voice and data network compatibility, and in addition provide an LTE modem for purposes of accessing the LTE network. More specifically, CDMA modems provide for CDMA-based voice (e.g., 1x RTT) and data (HRPD, EV-DO) communications, but they do not provide for LTE because LTE functions according to an entirely different set of protocols and modulation schemes.

Integrating existing data capabilities with LTE would be less problematic were it not for the fact that LTE is not universally fielded. That is, LTE networks are in their infancy and there are currently only a few pockets of LTE coverage in selected major metropolitan areas. Consequently, cell phone developers must provide for the handoff of data sessions from LTE to legacy data networks and vice versa. And the present inventors have observed that this handoff requirement if extremely onerous from a developer's point of view because the interface requirements of LTE modems are not standardized, thus requiring significant modification of a legacy voice/data modem for each LTE modem in the inventory. Consequently, the development costs—in terms of both investment and time—are substantial when directed at developing a multimode smartphone solution.

Accordingly, what is needed is an apparatus and method that enables existing legacy voice/data modems to be employed in a cellular device in conjunction with an LTE modem from any manufacturer, where interoperation of the two modems is seamless, and where significant modification of the legacy voice/data modem is minimized.

What is also needed is a generalized application programming interface and commensurate hardware that a legacy voice/data modem can utilize to interface and interoperate with a plurality of LTE modems.

SUMMARY OF THE INVENTION

The present invention, among other applications, is directed to solving the above-noted problems and addresses other problems, disadvantages, and limitations of the prior art. The present invention provides a superior technique for providing a multimode smartphone having IRAT internetworking capabilities. In one embodiment, an apparatus for support of connectionless machine type communication (MTC) in a long-term evolution (LTE) environment is provided. The apparatus includes an LTE modem and a code demand multiple access (CDMA) modem. The LTE modem is configured to access a first wireless network and execute first data transactions over the first wireless network, where the first wireless network comports with LTE radio access technology (RAT) standards. The CDMA modem is operationally coupled to the LTE modem, and is configured to access a second wireless network and execute second data transactions over the second wireless network, where the second wireless network comports with one or more CDMA-based RAT standards. The CDMA modem includes an inter-radio access technology (IRAT) application programming interface (API) element and an inter-process communication (IPC) module. The IRAT API element is configured to send/receive IRAT messages via function calls to/from the LTE modem, where the IRAT messages remain the same regardless of interface requirements for the LTE modem. The IPC module is coupled to the IRAT API element, and is configured to generalize the function calls to enable the CDMA modem to interoperate with the LTE modem.

One aspect of the present invention contemplates an apparatus for support of connectionless machine type communication (MTC) in a long-term evolution (LTE) environment. The apparatus has an LTE modem and a code demand multiple access (CDMA) modem. The LTE modem is configured to access a first wireless network and execute first data transactions over the first wireless network, where the first wireless network comports with LTE radio access technology (RAT) standards. The CDMA modem is operationally coupled to the LTE modem, and is configured to access a second wireless network and execute second data transactions over the second wireless network, where the second wireless network comports with one or more CDMA-based RAT standards. The CDMA modem includes an inter-radio access technology (IRAT) application programming interface (API) element, an inter-process communication (IPC) module, and an application processor. The IRAT API element is configured to send/receive IRAT messages via function calls to/from the LTE modem, where the IRAT messages remain the same regardless of interface requirements for the LTE modem. The IPC module is coupled to the IRAT API element, and is configured to generalize the function calls to enable the CDMA modem to interoperate with the LTE modem. The application processor is coupled to the LTE modem and to the CDMA modem, and is configured to implement main call control to internetwork between the modems.

Another aspect of the present invention comprehends a method for support of connectionless machine type communication (MTC) in a long-term evolution (LTE) environment. The method includes: via an LTE modem, first accessing a first wireless network and first executing first data transactions over the first wireless network, where the first wireless network comports with LTE radio access technology (RAT) standards; and via a code demand multiple access (CDMA) modem, operationally coupled to the LTE modem, second accessing a second wireless network and second executing second data transactions over the second wireless network, where the second wireless network comports with one or more CDMA-based RAT standards. The second executing includes: via an inter-radio access technology (IRAT) application programming interface (API) element, sending/receiving IRAT messages via function calls to/from the LTE modem, where the IRAT messages remain the same regardless of interface requirements for the LTE modem; and via an inter-process communication (IPC) module that is coupled to the IRAT API element, generalizing the function calls to enable the CDMA modem to interoperate with the LTE modem.

BRIEF DESCRIPTION OF THE DRAWINGS

These and other objects, features, and advantages of the present invention will become better understood with regard to the following description, and accompanying drawings where:

FIG. 5 is a flow diagram illustrating and IRAT application programming interface call flow sequence according to the present invention that shows an exemplary global mode system selection (GMSS) and enhanced high rate packet data (EHRPD) setup; and FIG. 6 is a flow diagram detailing an IRAT application programming interface usage call flow sequence according to the present invention featuring a long term evolution (LTE) to EHRPD system redirection with measurements.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
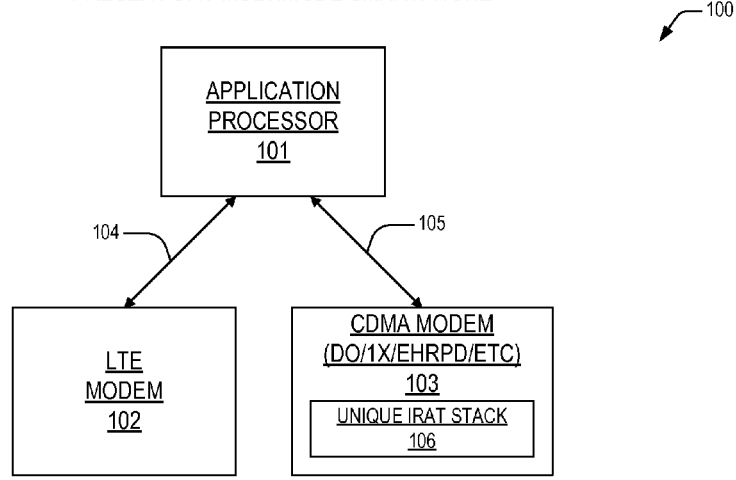
FIG. 1 is a block diagram illustrating a present day multimode smartphone that exhibits a unique inter-radio access technology stack.

In view of the above background discussion on multimode interfaces for smartphone applications, a discussion of the limitations of present day devices will be presented with reference to FIG. 1. Following this, a discussion of the present invention will now be presented with reference to FIGS. 2-6. The present invention overcomes the limitations of present day multimode smartphones by providing application programming interface mechanisms that allow for interoperation of inter-radio access technology (IRAT) modems that are developed by different manufacturers Turning to FIG. 1, a block diagram illustrating a present day multimode smartphone 100 that exhibits a unique inter-radio access technology stack 106. The smartphone is typical of what is currently being fielded in the art, consisting of an application processor (AP) 101 that is coupled to a code division multiple access (CDMA) modem 103 via a bus 105. Representative CDMA modems 103 perform those calling and data functions that are well known in the art such as 1x RTT, data optimized (DO), enhanced high rate packetized data (EHRPD), and etc.

The AP 101 is also coupled to a long term evolution (LTE) modem 102 via bus 104. As one skilled in the art will appreciate, CDMA and LTE are two entirely different radio technologies and although they are employed together within the present day smartphone 100, there is a requirement for coordinated interoperation between CDMA and LTE such as performing handoffs between DO and LTE, LTE and EHRPD, and etc. It is beyond the scope of this application to provide a comprehensive presentation of these different radio technologies that are employed for data transactions, however it is sufficient to note that a present day multimode smartphone requires that there be a seamless and integrated interface between the modems 102, 103 providing these two disparate radio technologies because there will arise situations where no LTE coverage is provided and the phone 100 must revert back to, say, EHRPD in order to complete a data flow. And as the phone 100 continues movement, LTE coverage many indeed reappear, thus providing a requirement for handoff back to LTE from EHRPD. The above example is only one of many instances that illustrate the necessity for integrated operation between the two modems 102, 103.

Operationally, the AP 101 implements main call control to internetwork between the LTE modem 102 and the CDMA modem 103. If the two modems 102, 103 are developed by the same manufacturer, then seamless integration is achieved as part of the design process. However, as is more and more prevalent, if the two modems 102, 103 are developed by different manufacturers, then one of the modems 102, 103 must provide a mechanism to perfect seamless interoperability. This case is shown in FIG. 1 where the CDMA modem 103 includes a unique IRAT stack 106 that allows for interoperation of the CDMA modem 103 with the LTE modem 102 as described above.

As noted, in a wireless HRPD/EHRPD/LTE multimode handset 100, a user can access both the LTE and DO network whenever coverage of either is available. Thus LTE and CDMA modems 102, 103 must internetwork with each other in order to perform such functions as global mode system selection (GMSS). In addition, these modems 102, 103 must internetwork in order to accomplish all of the LTE-DO redirection and reselection IRAT procedures. In a typical operation, the smartphone 100 powers up, performs system selection procedures according to the GMSS algorithm, and acquires an LTE or CDMA network according to an associated carrier's priorities and roaming list. When the device 100 moves from coverage of one technology to another, a reselection or redirection handoff procedure is performed. The execution of such IRAT operations may involve measurements of signal quality of both network technologies prior to the handoff. When the quality of a current technology network degrades and another better network technology is available, a handoff may be performed. Such interworking operations require the definition and coordination of all the IRAT call flow sequence between the two technologies. As also alluded to, if the manufacturers of the modems 102, 103 are different, these IRAT application programming interface (API) and call flow sequencing must be defined and implemented clearly to allow for seamless internetworking. Such is the function of the unique IRAT stack 106 shown in the CDMA modem 103 of FIG. 1.

Alternatively, if an HRPD/EHRPD wireless technology modem developer wants interoperate with the LTE modem 102, then that developer must invest in the development effort of a unique IRAT stack 106, often requiring the definition of unique IRAT call flows for all interworking usage scenarios, several of which are noted above.

If the HRPD/EHRPD wireless technology modem manufacturer already has IRAT call stack capabilities with one LTE/AP manufacturer and desires to interoperate with an LTE wireless modem 102 from another LTE/AP vendor as a solution, there is a requirement to integrate and customize the IRAT stack 106 to interoperate with the modem 102 from the other LTE/AP vendor because IRAT call flows are typically different for each LTE/AP manufacturer. Thus, significant customization or adaptation is needed to realize a multimode device 100, requiring significant investment in development to support this unique solution.

As one skilled in the art will appreciate, these unique interface solutions are proprietary and customized according to each manufacturer, and cannot be ported to any other LTE/AP wireless modem manufacturer without significant effort and investment. Furthermore, providing unique internetworking solutions is disadvantageous because of the difficulty required to incorporate requirements for a new carrier because the new carrier's requirements would need to be duplicated across all the customized IRAT solutions for each different manufacturer.

The present inventors have observed that providing a unique IRAT stack 106 to interface to different LTE modems 102 is not adaptable for a different manufacturer's solution that has different inter-process communication (IPC) methods, such as using a proprietary IPC mechanism or using AT commands from the well known Hayes command sent to communicate between the AP 101 and the CDMA modem 103. Consequently, a unique IRAT stack 106 is not reusable, it requires significant effort to incorporate new additional carrier's requirements, it is not adaptable to any other wireless technologies in a multimode device 100, it is not flexible for different configurations such as smartphone with a direct LTE/DO datacard, and it is not portable to different platforms such as single or multiple chip configurations.

To overcome the above noted limitations and disadvantages, the present inventors have provided an interface and internetworking mechanism within a CDMA modem according to the present invention that allows for seamless interoperation between the CDMA modem and LTE modems from other manufacturers.

Figure 2:
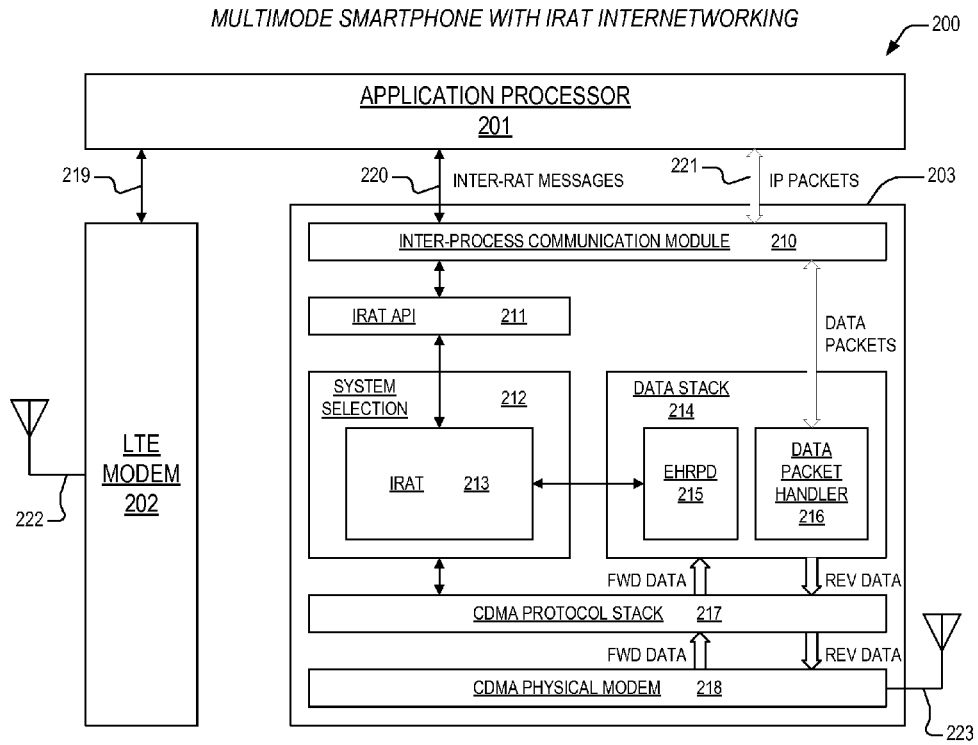
FIG. 2 is a block diagram depicting a multimode smartphone according to the present invention that features integral inter-radio access technology internetworking elements.

Referring now to FIG. 2, a block diagram is presented depicting a multimode smartphone 200 according to the present invention that features integral inter-radio access technology (IRAT) internetworking elements. The multimode smartphone 200 is particularly suited in architecture for interfacing an LTE modem 202 to a CDMA modem 203 that is employed for performing DO functions or functions corresponding with a different radio access technology (RAT).

The smartphone 200 includes an AP 201 that is coupled to an LTE modem 202 via bus 219. The LTE modem 202 is coupled to a corresponding antenna 222. In operation, the LTE modem 202 performs those functions associated with transmission and reception of data according to the LTE protocol and RAT.

The smartphone 200 also includes a CDMA modem 203 that is coupled to the AP 202 via busses 220 and 221. Bus 220 is configured to provide inter-RAT messages between the modem 203 and the AP 201. Bus 221 is configured to provide Internet protocol (IP) packets between the modem 203 and the AP 201. The CDMA modem 203 includes a system selection element 212 that is coupled to a data stack 214. The selection element 212 and the data stack 214 are coupled to a CDMA protocol stack 217. The CDMA protocol stack 217 is coupled to a CDMA physical modem 218. The CDMA physical modem 218 is coupled to a corresponding antenna 223.

The system selection element 212 includes an IRAT element 213 that is employed to select between the RATs that are provided for by the device 200. The data stack 214 includes an EHRPD element 215 and a data packet handler 216. Forward and reverse data packets from between the corresponding antenna 223, the physical modem 218, the protocol stack 217 and the data stack 214 in accordance with direction from the system selection element 212.

In contrast to a conventional multimode smartphone 100, which employs a unique stack 106 configured to interface to a specific manufacturer's LTE modem 102, the CDMA modem 203 according to the present invention also includes an inter-process communication module 210 and an IRAT application programming interface (API) element 211 that are configured to generalize function calls and data that are associated with inter-RAT handoffs and communication. As will be detailed below, API functions are defined to allow any manufacturer's LTE modem 202 to interoperate with the CDMA modem 203 according to the present invention via inter-RAT messages provided over bus 220 to/from the AP 201.

In one embodiment, the AP 201 and LTE modem 202 represent a different manufacturer's solution which can interwork with the CDMA modem 203 according to the present invention, via the communication module 210 and API 211. In one embodiment, the CDMA modem 203 is configured to perform functions corresponding to EHRPD, DO, and 1x protocols. The inter-process communication (IPC) module 210 is configured to route messages and packet data between the AP 201 and the CDMA modem 203

The CDMA protocol stack 217 implements the 1X and DO protocol state machines required to handle traffic channel call setup, releases, and other protocol features such as handoff according to the 3gpp2 standards. The EHRPD stack 215 implements the 3gpp2 standards' specified EHRPD requirements to interoperate with the Enhanced Packet Core Network for Universal Mobile Telecommunications System (UMTS) and other radio access technologies. The data packet handler 216 processes and routes the IP/Point-to-Point Protocol (PPP) data path packets between the AP 201 and the CDMA modem 203 via the IPC module 210.

The IRAT API 211 and stack 213 includes an IRAT_API layer which hosts a suite of adaptable and flexible IRAT Interworking APIs, that any LTE/AP manufacturer can interface with to realize any DO/LTE interworking call flow. The IRAT_API layer provides an abstraction for the IRAT stack 213, which then interfaces with the EHRPD stack 215, data packet handler 216, and CDMA protocol stack 217. The IRAT stack 213 implements the DO/LTE interworking handling for each IRAT_API function call, and triggers the EHRPD stack 215 and CDMA protocol stack 217 to perform the necessary actions.

The IRAT API 211 and IRAT stack 213 are adaptable to other RATs as well, for any other DO/OtherRAT interworking operations, such as DO/WiFi, DO/802.15, or DO/BLUETOOTH®. The IRAT API 211 and IRAT stack 213 are easily extensible to implement any carrier's new additional requirements.

The IRAT API 211 and IRAT stack 213 are adaptable to all manufacturer's LTE modems 202 and APs 201 by providing a generic IRAT API suite of functions. Because the API functions according to the present invention are performed automatically, the IRAT API 211 and stack 213 solution according to the present invention can flexibly accommodate any manufacturer's specific requirements.

Accordingly, the LTE 202/AP 201 manufacturer provides an IPC layer 210 which calls the IRAT API functions.

The smartphone 200 according to the present invention is configured to perform the functions and operations as discussed above. The smartphone 200 comprises logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the smartphone 200 may be shared with other circuits, microcode, etc., that are employed to perform other functions and/or operations within the smartphone 200. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) processor. For a complex instruction set computer (CISC) processor, CISC instructions are translated into associated micro instructions, and the associated micro instructions are directly executed by a unit or units within the CISC processor.

Figure 3:
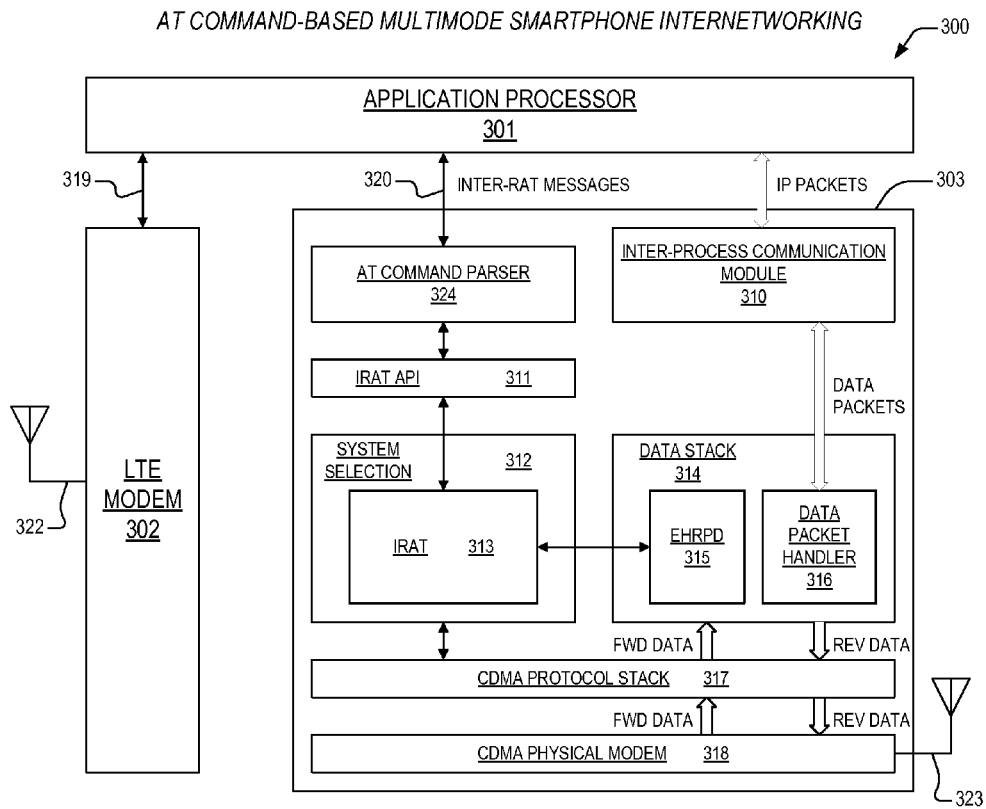
FIG. 3 is a block diagram depicting a multimode smartphone according to the present invention that features integral inter-radio access technology internetworking elements that are compatible with an application processor utilizing attention (AT) commands.

Turning to FIG. 3, a block diagram is presented depicting a multimode smartphone 300 according to the present invention that features integral inter-radio access technology internetworking elements that are compatible with an application processor 301 utilizing attention (AT) commands. The smartphone 300 according to the embodiment of FIG. 3 is substantially similar in configuration and function as the smartphone 200 discussed above with reference to FIG. 2, where like-numbered elements having the hundreds digit replaced with a "3" operate in the same manner as their counterparts in FIG. 2. The smartphone 300 according to FIG. 3 has an additional AT command parser 324 that interfaces between the AP 301 at bus 320 and the IRAT API element 311.

Operationally, this architecture is adaptable to a manufacturer's AP/LTE solution that employs AT (i.e., Hayes) commands for AP 201 to CDMA modem 203 communications. Accordingly the AT parser 324 is provided to interface with the manufacturer's AP/LTE stack. The AT parser 324 interprets the manufacturer's AT commands and directly calls corresponding IRAT_API functions. The very same set of IRAT_API functions (discussed below) are employed by the smartphone 300 of FIG. 3 as by the smartphone 200 of FIG. 2.

The IRAT architecture discussed with reference to the smartphones 200, 300 of FIGS. 2-3 provide for a DO/LTE/Other RAT multimode configuration that includes an Application Processor 201, 301, however the present invention also contemplates other IRAT configurations that do not include an AP.

The smartphone 300 according to the present invention is configured to perform the functions and operations as discussed above. The smartphone 200 comprises logic, circuits, devices, or microcode, or a combination of logic, circuits, devices, or microcode, or equivalent elements that are employed to execute the functions and operations according to the present invention as noted. The elements employed to accomplish these operations and functions within the smartphone 300 may be shared with other circuits, microcode, etc., that are employed to perform other functions and/or operations within the smartphone 300.

Figure 4:
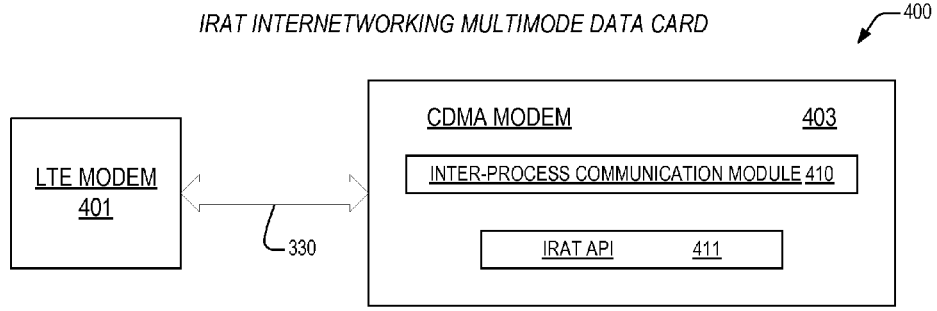
FIG. 4 is a block diagram showing one embodiment of an IRAT internetworking multimode data card according to the present invention.

Turning now to FIG. 4, a block diagram is presented showing one embodiment of an IRAT internetworking multimode data card 400 according to the present invention. The data card 400 includes another manufacturer's LTE modem 401 that is directly coupled to a CDMA modem 403 via bus 330. The CDMA modem 403 includes an IPC module 410 and an IRAT API element 411 as discussed above, where inter-RAT messages and packets are passed over the bus 330 rather than through an AP.

The IRAT API functions discussed with reference to FIGS. 2-4 comprise four categories of function calls: A) System Acquisition, B) CDMA System and Data Stack Management, C) DO/LTE System Handoff, and D) EHRPD Connection Management.

The data card 400 according to the present invention is configured to perform the functions and operations as discussed above. The data card 400 comprises logic, circuits, devices, or microcode, or a combination of logic, circuits, devices, or microcode, or equivalent elements that are employed to execute the functions and operations according to the present invention as noted. The elements employed to accomplish these operations and functions within the data card 400 may be shared with other circuits, microcode, etc., that are employed to perform other functions and/or operations within the data card 400.

According to the function calls which will now be discussed, an AP/LTE manufacturer can achieve various interworking call flow usage scenarios by deploying functions from the System Acquisition category to trigger CDMA system acquisition, followed by function calls from the EHRPD Connection Management category to setup packet data calls, or perform IRAT handoff interworking scenarios by calling functions in the DO/LTE System Handoffs category. Flexible control is given to the AP/LTE manufacturer to trigger CDMA system and data stack management by calling functions in the CDMA System and Data Stack Management category. The function calls from each of the four categories will now be described with reference to Tables 1-4.

A. IRAT Function Calls—System Acquisition Category

Table 1 below presents generic and adaptable IRAT interface function calls that can be deployed for any AP/LTE manufacturer solution, and are extensible to any other Radio Access Technology (RAT), and can accommodate a new carrier's requirements. This category of API function calls allow a user to control and trigger system acquisition of a CDMA modem according to the present invention in either 1x mode, DO mode, or in a hybrid 1X/DO mode. Typically, this is done in conjunction with the manufacturer's overall Global Multimode System Selection algorithm, taking into consideration the acquisition priorities of both the LTE and DO networks.

TABLE 1

IRAT API Function Calls for System Acquisition

| FUNCTION | DESCRIPTION |
| --- | --- |
| IRATApi_Registration_Hybrid_Req | The LTE/AP sends this request to CDMA for CDMA only mode operation. It will trigger hybrid mode operation of both Circuit Voice Service (CS) and Packet Service (PS) on CDMA network. The CDMA stack will do the following: Register for 1x if it was not already registered Establish eHRPD/HRPD Sessions Notify the user about the acquired and registered new Network mode (1x, 1x + HRPD, 1x + eHRPD) |
| IRATApi_Registration_Hybrid_Rsp | This IRATApi is called in response to IRATApi_Registration_Hybrid_Req. It will indicate the availability of the 1X, DO or EHRPD network. |
| IRATApi_Registration_1X_Only_Req | The LTE/AP sends this request to CDMA for triggering only 1X Acquisition and registration. |
| IRATApi_Registration_1X_Only_Rsp | This IRATapi is called in response to IRATApi_Registration_1X_Only_Req to return the status. |
| IRATApi_Irat_Mcc_Search_Req | This is used for starting the MCC search on the CDMA acquired system. |
| IRATApi_Irat_Mcc_Search_Rsp | This IRATapi is called in response to IRATApi_Irat_Mcc_Search_Req to return the status. |

B. IRAT API Function Calls—CDMA System and Data Stack Management Category

Table 2 below shows the IRAT API function calls that allow the user to control and trigger CDMA System and Data Stack management. The user employs this category of API function calls to trigger CDMA system registration for packet service, or packet data call setup and releases, or state control such as suspend, resume, disable. These API function calls also send notifications whenever CDMA system and Packet Data states change.

TABLE 2

IRAT API Function Calls for CDMA Data Stack Management

| FUNCTION | DESCRIPTION |
| --- | --- |
| IRATApi_Data_Network_State_Change_Notify | This API is called to return the status of the CDMA network for the following, whenever there are any status changes: 1x RTT CS 1x RTT PS HRPD PS |

TABLE 2-continued

IRAT API Function Calls for CDMA Data Stack Management

| FUNCTION | DESCRIPTION |
| --- | --- |
| | eHRPD PS Failure case |
| IRATApi_Irat_Trigger_PS_Reg_Req | This API triggers DO to acquire system if not already acquired, and then attempts to open a DO session, if not already opened. The opened DO session can be either EHRPD or HRPD, and this status will be returned to the user. |
| IRATApi_Irat_Trigger_PS_Reg_Rsp | This IRATApi is called in response to IRATApi_Irat_Trigger_PS_Req_Req to return the status. |
| IRATApi_Irat_Trigger_PS_Reg_Freq_Req | If a CDMA system has been acquired and EHRPD session opened already, then this will trigger CDMA to acquire specified frequency F, if the current acquired system is not on freq F. If no CDMA system has been acquired, then it will attempt to acquire a CDMA system with the specified frequency F, and open a DO session. |
| IRATApi_Irat_Trigger_PS_Reg_Freq_Rsp | This IRATApi is called in response to IRATApi_Irat_Trigger_PS_Req_Freq_Req to return the status. |
| IRATApi_Irat_Trigger_PS_Reg_CellIds_Req | If a CDMA system has been acquired and EHRPD session opened already, then this will trigger CDMA to acquire the specified frequency F, if the current acquired system is not on freq F. If the current PN is not in the list of specified pilots, it will also Idle Handoff to the strongest PN available. If no CDMA system has been acquired, then it will attempt to acquire a CDMA system with the specified frequency F, and open a DO session. |
| IRATApi_Irat_Trigger_PS_Reg_CellIds_Rsp | This IRATApi is called in response to IRATApi_Irat_Trigger_PS_Req_CellIds_Req to return the status. |
| IRATApi_Cdma_No_Service_Req | This API puts the CDMA modem into a low power suspend mode and Deep Sleep. If there are any pending 1X/DO/EHRPD packet call connections, these will all be released first. |
| IRATApi_Cdma_No_Service_Rsp | This IRATApi is called in response to IRATApi_Irat_Cdma_No_Service_Req to return the status. |
| IRATApi_Set_PS_Connection_Req | This is used to request DO chip to start PS connection on the specified CDMA service (1X or DO). Note that for EHRPD packet data service, the user should use IRATApi_Ehrpd_Default_Bearer_Req instead. The user should make sure that the requested system should be acquired and registered in service first before calling this function, through the notification information in the IRATApi_Data_Network_State_Change_Notify indication. Some examples of usage: 1. If the network was acquired with IRATApi_Registration_Hybrid_Req and registered successfully with both 1X and DO in service, then IRATApi_Set_PS_Connection_Req can be called with either (1X or DO). 2. If the 1X network was acquired and registered with IRATApi_Registration_1X_Only_Req, then IRATApi_Set_PS_Connection_Req can be called with 1X, but not DO. 3. If the 1X network was acquired and registered with IRATApi_Registration_1X_Only_Req, then the DO network is subsequently acquired and registered with IRATApi_Irat_Trigger_PS_Reg_Req, then IRATApi_Set_PS_Connection_Req can be called with either 1X or DO. |
| IRATApi_Irat_Data_Connection_Cmd | This API Suspend/Resume/Disable the data traffic. If Suspend => go into Suspend Mode If Resume => go from Suspend Mode |

TABLE 2-continued

IRAT API Function Calls for CDMA Data Stack Management

| FUNCTION | DESCRIPTION |
| --- | --- |
| IRATApi_Irat_DataState_Ind | into Dormant Mode<br>If Disable => Disconnect PS connection on CDMA (only 1xRTT CS is required).<br>This notification is sent when the CDMA modem switches among the following state:<br>Active (PS is active on data path)<br>Dormant (ppp link still up, no TCH)<br>Idle (ppp inactivity expired and released, but PS still on CDMA side. Can reestablish PPP link if needed)<br>Suspend (just like dormant, but cannot reactivate. A transient state only)<br>Disabled (no PS on CDMA side, will wait for AP/LTE to send trigger to setup PS on CDMA)<br>Unavailable (caused by 1X is on voice call)<br>This IRATapi is called whenever these CDMA data state changes. |

C. IRAT API Function Calls—DO/LTE System Handoff Category

Table 3 below shows the IRAT API function calls that allow the user to control and manage CDMA system functions related to handoff scenarios. The user employs this category of API function calls to trigger CDMA system measurement reporting. In addition, these function calls also send indications for LTE neighbor information whenever they are received in the CDMA network.

TABLE 3

IRAT API Function Calls for DO/LTE System Handoff

| FUNCTION | DESCRIPTION |
| --- | --- |
| IRATApi_Irat_Measure_Cmd | This API when called, will cause CDMA stack to start measuring network information based on the given IRAT measurement information from LTE system.<br>If the DO system is not acquired, it will first acquire the DO network, then trigger a DO session opening. After that, it will attempt to acquire each frequency in the Frequency List specified, and do measurements for each PN in the specified PN List.<br>Finally, all the measurement results will be collated and sent in a measurement report in the IRATApi_Irat_Measure_Result_Ind( ). |
| IRATApi_Irat_Measure_Result_Ind | This IRATapi is called in response to IRATApi_Irat_Measure_Cmd, to return the requested measurement report. |
| IRATApi_Irat_Measure_SIB8_Cmd | This API when called, will cause CDMA stack to start measuring network information based on the given IRAT System Information Block 8 (SIB8) information from LTE system.<br>If the DO system is not acquired, it will first acquire the DO network, then trigger a DO session opening. After that, for each Band in the BandList, it will attempt to acquire each frequency in the Frequency List specified for each Band, and do measurements for each PN in the specified PN List.<br>Finally, all the measurement results will be collated and sent in a measurement report in the IRATApi_Irat_Measure_SIB8_Result_Ind( ) |
| IRATApi_Irat_Measure_SIB8_Result_Ind | This IRATapi is called in response to IRATApi_Irat_Measure_SIB8_Cmd, to return the requested measurement report. |
| IRATApi_Stop_Cdma_Meas_Req | This API is used to abort and cancel the ongoing CDMA measurements initiated by earlier measurement request(IRAT MEAS or SIB8 MEAS). this will cause no measurement result being sent back. |

TABLE 3-continued

IRAT API Function Calls for DO/LTE System Handoff

| FUNCTION | DESCRIPTION |
| --- | --- |
| IRATApi_Cdma_Serving_Meas_Req | This API is used to request CDMA stack to perform serving CDMA network signal measurement. |
| IRATApi_Cdma_Serving_Meas_Rsp | This IRATApi is called in response to IRATApi_Cdma_Serving_Meas_Req. |
| IRATApi_Cdma_Tx_Power_Req | This API is used to request CDMA stack to return the current CDMA Transmit power. |
| IRATApi_Cdma_Tx_Power_Rsp | This IRATApi is called in response to IRATApi_Cdma_Tx_Power_Rsp. |

D. IRAT API Function Calls—EHRPD Connection Management Category

Table 4 below shows the IRAT API function calls that allow the user to control and manage EHRPD connections. The user employs this category of API function calls to trigger EHRPD default and dedicated bearer connection setups and releases, which are usually called after the CDMA system is acquired or after LTE has decided to handoff the system to EHRPD.

Turning now to FIG. 5, a flow diagram is presented illustrating an exemplary IRAT API function call flow sequence 500 according to the present invention that shows an exemplary global mode system selection (GMSS) and enhanced high rate packet data (EHRPD) setup. The flow sequence 500 is presented in terms of the IRAT API function calls that are exchanged between a CDMA modem 501 according to the present invention comprising an IRAT stack 502 and a data

TABLE 4

IRAT API Function Calls for EHRPD Connection Management

| FUNCTION | DESCRIPTION |
| --- | --- |
| IRATApi_Ehrpd_Default_Bearer_Req | This API is used to request any EHRPD Default Bearer setup. The user should make sure that EHRPD is registered (via the IRATApi_Data_Network_State_Change_Notify( )) before calling this function. When called, the CDMA stack setups a EVDO traffic connection, then trigger EHRPD Default Bearer attach procedures. |
| IRATApi_Ehrpd_Default_Bearer_Rsp | This IRATApi is called in response to IRATApi_Ehrpd_Default_Bearer_Req. This is used to return the default bearer setup result of main PDN connection. Either the IP address on successful bearer setup or the error code is returned. |
| IRATApi_Ehrpd_Dedicated_Bearer_Req | This API is used to setup EHRPD Dedicated Bearer Auxiliary connections. The user should make sure that the DO system is acquired, and the EHRPD is negotiated. In addition, the Default Bearer Setup (for this Dedicated Bearer) should also have been setup successfully before. |
| IRATApi_Ehrpd_Dedicated_Bearer_Rsp | This IRATApi is called in response to IRATApi_Ehrpd_Dedicated_Bearer_Req to return the status and parameters of the setup. |
| IRATApi_Ehrpd_Dedicated_Bearer_Ind | This IRATApi is called if the Network initiates Dedicated Bearer setups. The CDMA stack will send this indication once the auxiliary connection is setup. |
| IRATApi_Ehrpd_Detach_Req | The user can use this interface to request a complete EHRPD detach, which will disconnect all the EHRPD default and dedicated bearers. |
| IRATApi_Ehrpd_Detach_Rsp | This IRATApi is called in response to IRATApi_Ehrpd_Detach_Req. |
| IRATApi_Ehrpd_Bearer_Disconnect_Req | This API is used to disconnect the bearer. This can be used for both dedicated or the default bearers. |
| IRATApi_Ehrpd_Bearer_Disconnect_Rsp | This IRATApi is called in response to IRATApi_Ehrpd_Bearer_Disconnect_Req to return the status. |
| IRATApi_Ehrpd_Bearer_Disconnect_Ind | This IRATApi is called if the network disconnects any default or dedicated bearers. |
| IRATApi_Ehrpd_Set_Ipv6_Addr | This interface is used to set a Pdn's IPv6 address. |
| IRATApi_Ehrpd_Clear_Ipv6_Addr | This interface is used to clear a Pdn's IPv6 address. | stack 503, and an AP/LTE inter-process communication (IPC) element 504 (or a data card having only an LTE modem), as described above with reference to FIGS. 2-4 and Tables 1-4.

Flow begins at block 515 where the AP/LTE 504 sets a wireless device according to the present invention into a Global Mode System Selection, and performs a system selection algorithm to select a next available system. Accordingly, a CDMA 1X circuit switched voice system is desired to be acquired and registered first, so the AP/LTE 504 calls the IRATApi_Registration_1X_Only_Req function to trigger the 1X system acquisition. Flow then proceeds to block 505.

At block 505, the CDMA 1X system is acquired and registered, and an IRATApi_Registration_1X_Only_Rsp call is returned to the AP/LTE 504 by the CDMA modem 501. In addition, once the CDMA 1X system is acquired and registered, an IRATApi_Data_Network_State_Change_Notify (1X) indication is also returned to the AP/LTE 504 to indicate a change in the network status. Flow then proceeds to block 506.

At block 506, the CDMA system is selected and the AP runs the Global Mode System Selection algorithm based on current acquired LTE and CDMA status. At this point, the AP/LTE 504 might have attempted to also acquire an LTE system but was not successful, and so it decides that the next selected system should be a CDMA DO system. Thus, the AP/LTE (IPC) 504 triggers the IRATApi_Irat_Trigger_PS_Reg_Req function call to acquire and register to an EHRPD/DO system for packet data calls. Flow then proceeds to blocks 507 and 508.

At blocks 507, 508, the DO system is acquired, and a DO Session is setup with EHRPD negotiated. The CDMA modem 501 calls the IRATApi_Irat_Trigger_PS_Reg_Rsp function, which informs the AP/LTE (IPC) 504. In addition, once the CDMA DO system is acquired and registered with EHRPD packet service capability, an IRATApi_Data_Network_State_Change_Notify (EHRPD) function call is executed to indicate to the AP/LTE 504 a change in the network status. Flow then proceeds to blocks 509, 510

At blocks 509, 510, the EHRPD network is registered and the AP/LTE (IPC) 504 triggers the EHRPD main default bearer connection setup by calling the IRATApi_Ehrpd_Default_Bearer_Req function, with the desired Default Bearer PDN Access Point Name (APN), IPversion type (IPv4/IPv6), and other required information. Flow then proceeds to blocks 511, 512.

At block 511, the EVDO traffic channel connection is setup, followed by block 512 where an EHRPD Attach procedure is executed to establish the default bearer connection. Following this, the IRATApi_Ehrpd_Default_Bearer_Rsp function is called to indicate to the AP/LTE (IPC) 504 the terminal's IP address information and other optional parameters given by the EHRPD network. In addition, when the CDMA packet data state becomes active, the CDMA modem 501 sends an IRATApi_Irat_Cdma_DataState_Ind function call back to the AP/LTE (IPC) 504. Flow then proceeds to block 513.

At block 513, the AP/LTE (IPC) 504 may also trigger other auxiliary dedicated bearer connections by calling the IRATApi_Ehrpd_Dedicated_Bearer_Req function. Flow then proceeds to block 514.

At block 514, once these dedicated bearer connections are setup with the network, the IRATApi_Ehrpd_Dedicated_Bearer_Rsp function is returned to the AP/LTE (IPC) 504, thus completing the exemplary call flow sequence 500.

Turning now to FIG. 6, a flow diagram is presented detailing an IRAT application programming interface usage call flow sequence 600 according to the present invention featuring a long term evolution (LTE) to EHRPD system redirection with measurements. The flow sequence 600 is presented in terms of the IRAT API function calls that are exchanged between a CDMA modem 601 according to the present invention comprising an IRAT stack 602 and a data stack 603, and an AP/LTE inter-process communication (IPC) element 604 (or a data card having only an LTE modem), as described above with reference to FIGS. 2-4 and Tables 1-4. The sequence 600 shows an example usage of the IRAT APIs for performing an LTE to EHRPD handoff, with periodic measurement requests made on the CDMA system. Once the conditions for LTE to EHRPD handoff are met (when the LTE conditions becomes weaker than the CDMA system), the AP/LTE (IPC) 604 can initiate this handoff.

Flow begins at block 605 where the AP/LTE (IPC) 604 is in the Global Mode and the Packet Service is currently active on the LTE system, concurrent with 1X Circuit Voice Service. Once a user traveling with a smartphone within which the elements 601, 604 are disposed gets near a handoff boundary, the AP/LTE (IPC) 604 can periodically trigger measurements on the CDMA system by issuing the IRATApi_Irat_Measure_Cmd function, with a list of desired frequencies and pilots. This information may be given by an associated LTE network. Flow then proceeds to block 606.

At block 606, if this is measurement is triggered for the first time, then the CDMA system first acquires the DO system, and flow proceeds to block 607 where a DO session is set up before performing any measurement. Flow then proceeds to block 608 where the CDMA modem 601 then acquires each frequency in the Frequency List received, and performs measurements on each of the pilots in the Pilot List received. The desired list of measurements are returned in the IRATApi_Irat_Measure_Result_Ind function to the AP/LTE (IPC) 604. Flow then proceeds to block 609.

At block 609 the AP/LTE (IPC) 604 runs its algorithm based on the CDMA measurements and current LTE strength. Once the conditions for LTE to EHRPD handoff are met, it can issue an IRATApi_Irat_Trigger_PS_Reg_Freq_Req function to the CDMA system 601 indicating a desired frequency for the handoff. Flow then proceeds to block 610.

At block 610 the CDMA system 601 acquires the desired frequency if its current frequency is not the desired one. Since an EHRPD DO session is already opened, the LTE to EHRPD handoff is quick and the CDMA system 601 returns the IRATApi_Irat_Trigger_PS_Reg_Freq_Rsp function immediately. Accordingly, the IRATApi_Data_Network_State_Change_Notify (EHRPD) function is called thus indicating to the AP/LTE 604 availability of EHRPD packet service. Consequently, the AP/LTE 604 tears down LTE packet resources.

Flow then proceeds to block 611 where the AP/LTE 604 triggers EHRPD connection setups as desired. Accordingly, the AP/LTE 604 triggers EHRPD default bearer connection setup with handoff attach type to handoff the packet service from the AP/LTE 604 to the EHRPD system, using the IRATApi_Ehrpd_Default_Bearer_Req function, with the desired Default Bearer PDN Access Point Name (APN), and existing AP's IP address assigned by the LTE network.

Flow then proceeds to block 612 where the CDMA system 601 initiates an EVDO traffic connection setup. Flow then proceeds to block 613 where the CDMA system 601 triggers an EHRPD Default Bearer Attach. The CDMA network sets up the EHRPD connections, and returns with the IRATApi_Ehrpd_Default_Bearer_Rsp and indicates a change of state by calling IRATApi_IRAT_CDMA_DataState_Ind (Active).

At this point, the LTE to EHRPD handoff is successfully completed.

Those skilled in the art should appreciate that they can readily use the disclosed conception and specific embodiments as a basis for designing or modifying other structures for carrying out the same purposes of the present invention, and that various changes, substitutions and alterations can be made herein without departing from the scope of the invention as defined by the appended claims.

What is claimed is:

1. An apparatus, comprising:
    an LTE modem, configured to access a first wireless network, wherein said first wireless network comports with LTE radio access technology (RAT) standards; and
    a code division multiple access (CDMA) modem, operationally coupled to said LTE modem, coupled to and configured to access a second wireless network, wherein said second wireless network comports with one or more CDMA-based RAT standards, said CDMA modem comprising:
    an inter-radio access technology application programming interface element, configured to send/receive a plurality of IRAT messages via a plurality of function calls to/from said LTE modem, wherein said IRAT messages are compatible with said first wireless network and an interface requirement for said LTE modem, and wherein said plurality of function calls comprises system acquisition for said second wireless network, second wireless network data stack management, first wireless network system handoff, and connection management, and wherein one of said plurality of function calls comprises a request initiated from said LTE modem to request operations only over a CDMA network, and wherein said request directs operation of both circuit voice service and packet service over said CDMA network; and
    an inter-process communication module, coupled to said IRAT API element, configured to generalize said plurality of function calls to enable said CDMA modem to interoperate with said LTE modem, wherein said inter-process communication module is coupled to said LTE modem through an application processor.

2. The apparatus as recited in claim 1, wherein said application processor is coupled to said CDMA modem, and is configured to implement a call control to internetwork between said modems.

3. The apparatus as recited in claim 1, wherein said LTE modem and said CDMA modem are disposed within a cell phone or a data card.

4. The apparatus as recited in claim 1, wherein said CDMA modem executes high rate packet data transactions over a data optimized (DO) network.

5. The apparatus as recited in claim 1, wherein one or more of said IRAT messages direct said LTE modem and said CDMA modem to perform measurements of signal quality prior to performing a handoff.

6. The apparatus as recited in claim 1, wherein said IRAT messages comprise a call flow sequence between said LTE modem and said CDMA modem.

7. The apparatus as recited in claim 1, wherein said CDMA modem further comprises:
    an AT parser, coupled to said IRAT API element, configured to interpret AT commands and to directly call corresponding ones of said plurality of function calls to send/receive corresponding IRAT messages.

8. An apparatus for a long-term evolution (LTE) environment, comprising:
    an LTE modem, configured to access a first wireless network and execute first data transactions over said first wireless network, wherein said first wireless network comports with LTE radio access technology (RAT) standards; and
    a CDMA modem, operationally coupled to said LTE modem, coupled to and configured to access a second wireless network and execute second data transactions over said second wireless network, wherein said second wireless network comports with one or more CDMA-based RAT standards, said CDMA modem comprising:
    an inter-radio access technology (IRAT) application programming interface (API) element, configured to send/receive IRAT messages via function calls to/from said LTE modem, wherein said IRAT messages remain the same regardless of said first wireless network and interface requirements for said LTE modem, and wherein said function calls comprise system acquisition for said second wireless network, second wireless network data stack management, first wireless network system handoff, and connection management, and wherein one of said function calls comprises a request initiated from said LTE modem to request operations only over a CDMA network, and wherein said request directs operation of both circuit voice service and packet service over said CDMA network; and
    an inter-process communication (IPC) module, coupled to said IRAT API element, configured to generalize said function calls to enable said CDMA modem to interoperate with said LTE modem; and
    an application processor, coupled to said LTE modem and to said CDMA modem, configured to implement a call control to internetwork between said modems, wherein said IPC module is coupled to said LTE modem through said application processor.

9. The apparatus as recited in claim 8, wherein said LTE modem and said CDMA modem are disposed within a cell phone.

10. The apparatus as recited in claim 8, wherein said CDMA modem executes high rate packet data transactions over a data optimized (DO) network.

11. The apparatus as recited in claim 8, wherein one or more of said IRAT messages direct said LTE modem and said CDMA modem to perform measurements of signal quality prior to performing a handoff.

12. The apparatus as recited in claim 8, wherein said IRAT messages comprise a call flow sequence between said LTE modem and said CDMA modem.

13. The apparatus as recited in claim 8, wherein said CDMA modem further comprises:
    an AT parser, coupled to said IRAT API element, configured to interpret AT commands and to directly call corresponding IRAT messages via said function calls.

14. A method for support of machine type communication (MTC), comprising:
    via an LTE modem, first accessing a first wireless network, wherein the first wireless network comports with LTE radio access technology (RAT) standards; and
    via a code division multiple access (CDMA) modem, operationally coupled to the LTE modem and coupled to a second wireless network, second accessing the second wireless network, wherein the second wireless network comports with one or more CDMA-based RAT standards, wherein said second accessing comprises:

via an inter-radio access technology (IRAT) application programming interface (API) element, sending/receiving IRAT messages via function calls to/from the LTE modem, wherein the IRAT messages are compatible with said first wireless network and interface requirements for the LTE modem, and wherein the function calls comprise system acquisition for the second wireless network, second wireless network data stack management, first wireless network system handoff, and connection management, and wherein one of the function calls comprises a request initiated from the LTE modem to request operations only over a CDMA network, and wherein the request directs operation of both circuit voice service and packet service over the CDMA network; and via an inter-process communication (IPC) module that is coupled to the IRAT API element, generalizing the function calls to enable the CDMA modem to interoperate with the LTE modem, wherein the IPC module is coupled to the LTE modem through an application processor.

15. The method as recited in claim 14, further comprising:
via the application processor that is also coupled to the CDMA modem, implementing a call control to internetwork between the modems.

16. The method as recited in claim 14, wherein the LTE modem and the CDMA modem are disposed within a cell phone or a data card.

17. The method as recited in claim 14, wherein the CDMA modem executes high rate packet data transactions over a data optimized (DO) network.

18. The method as recited in claim 14, wherein one or more of the IRAT messages direct the LTE modem and the CDMA modem to perform measurements of signal quality prior to performing a handoff.

19. The method as recited in claim 14, wherein the IRAT messages comprise a call flow sequence between the LTE modem and the CDMA modem.

20. The method as recited in claim 14, wherein said second accessing further comprises:
via an AT parser that is coupled to the IRAT API element, interpreting AT commands and directly calling corresponding IRAT messages via the function calls.

* * * * *